United States Patent [19]
Ohkubo

[11] Patent Number: 5,276,683
[45] Date of Patent: Jan. 4, 1994

[54] MULTIPLEX COMMUNICATION SYSTEM

[75] Inventor: Yasuo Ohkubo, Tokyo, Japan

[73] Assignee: Kabushiki Kaisha Toshiba, Kawasaki, Japan

[21] Appl. No.: 661,189

[22] Filed: Feb. 27, 1991

[30] Foreign Application Priority Data

Feb. 28, 1990 [JP] Japan ................................. 2-45510

[51] Int. Cl.⁵ ............................................. H04J 3/24
[52] U.S. Cl. ................................. 370/92; 340/825.52
[58] Field of Search ............... 370/92, 93, 35.1, 85.1, 370/91, 67, 66; 359/165, 159, 104; 340/825, 52

[56] References Cited

U.S. PATENT DOCUMENTS

| 4,253,179 | 2/1981  | Shimizu ............................ | 370/92 |
| 4,856,091 | 8/1989  | Taska .............................. | 370/92 |
| 4,879,715 | 11/1989 | Nakabayashi et al. ............ | 370/92 |
| 4,916,692 | 4/1990  | Clarke et al. .................... | 370/92 |

OTHER PUBLICATIONS

"Advances in Multiplexing in Automobiles" by Kiencke, Feb. 1990, Society of Automotive Engineers, Inc.

Primary Examiner—Douglas W. Olms
Assistant Examiner—Dang Ton
Attorney, Agent, or Firm—Finnegan, Henderson, Farabow, Garrett & Dunner

[57] ABSTRACT

Data having an ID code attached thereto is transferred via a network line. The ID code is detected by an ID code detection circuit and data is received by a data receiving circuit. An ID code detected by the ID code detection circuit and an ID code previously stored in an ID comparing register are compared with each other by a comparator circuit. Predetermined ID codes corresponding to an engine rotation speed and car speed, for example, are stored in the ID comparing register. A masking circuit for masking one or more bits of the ID code is provided in the comparator circuit. The switching state of a switch for controlling the transfer of data received by the data receiving circuit is controlled according to a comparison output of the comparator circuit. When the ID codes are coincident with each other, the switch is turned on, causing data received by the data receiving circuit to be transferred to a CPU. A plurality of electronic instruments can be selected by use of a single ID code by masking at least one bit of the ID code by means of a masking circuit.

19 Claims, 5 Drawing Sheets

MULTIPLEX COMMUNICATION SYSTEM

BACKGROUND OF THE INVENTION

1. Field of the Invention

This invention relates to a multiplex communication system for detecting an ID code attached to data received from a network and transferring the received data to an instrument corresponding to the detected ID code and to a multiplex communication system which may be used in a broadcast communication system used on cars, for example.

2. Description of the Related Art

In the multiplex communication system used on cars, the types of data (such as the rotation speed of the engine and the speed of the car) are coded, attached to data as an ID code and transferred to a network. Each multiplex communication IC connected to the network detects the ID code, selects only necessary data from the received data and transfers the selected data to the CPU. This operation is effected to transfer only the necessary data among the received data to the CPU and prevent transfer of unnecessary data to the CPU, thereby reducing the load of the CPU. In general, a plurality of types of data are required by each CPU, and an ID code corresponding to data required by each CPU is detected by using a circuit system shown in FIG. 1 or 2 in the prior art.

Figure 1:
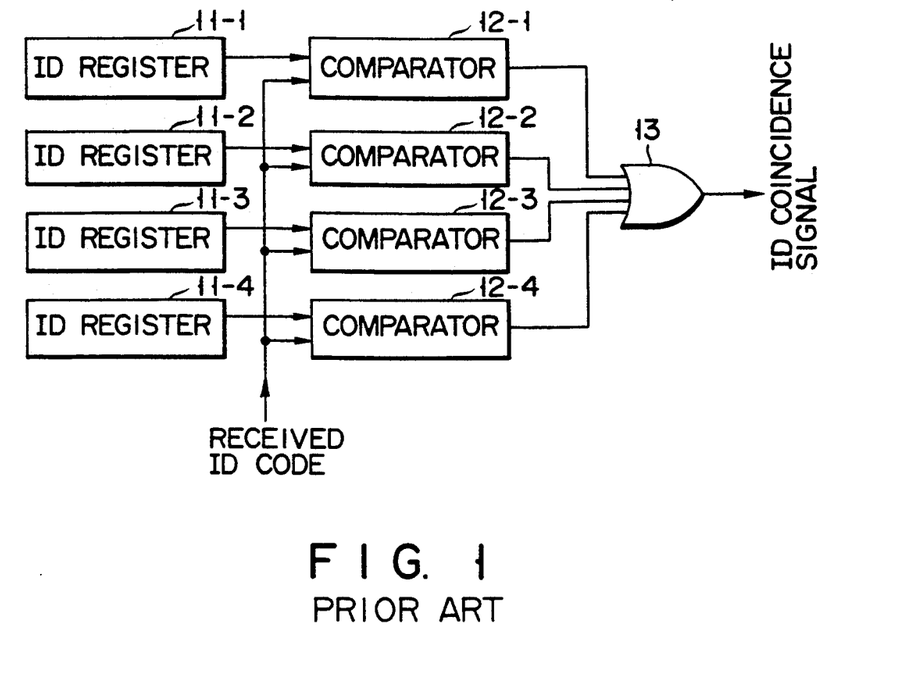
- FIGS. 1 and 2 are circuit diagrams showing the construction of an ID code comparing section in the conventional multiplex communication system.

The circuit shown in FIG. 1 has comparators of a number corresponding to the number of types of necessary data. That is, ID codes which are previously provided for the rotation speed of the engine and the speed of the car, for example, are stored in ID registers 11-1 to 1-4. The ID codes stored in the ID registers 11-1 to 11-4 and ID codes received are respectively supplied to and compared by comparators 12-1 to 12-4. The comparison outputs of the comparators 12-1 to 12-4 are supplied to an OR gate 13 to derive the logical sum thereof. When at least one of the received ID codes coincides with a corresponding one of the ID codes stored in the ID registers 11-1 to 11-4, a coincidence signal indicating the coincidence of the ID codes is output from the OR gate 13.

However, with the construction shown in FIG. 1, the number of ID codes increases with an increase in the number of types of data so that a large number of ID registers 11 and comparators 12 may be necessary, thereby increasing the size of the hardware. Particularly, since the comparators 12 require a relatively large pattern area when the circuit is formed in an IC form, it is disadvantageous when forming the circuit on one chip. Further, since it becomes difficult to change the number of ID codes after the circuit is formed in an IC form, it will be necessary to prepare a large number of comparators for allowance at the time of design. As a result, in many practical cases, redundant hardwares (comparators) may be provided.

Figure 2:
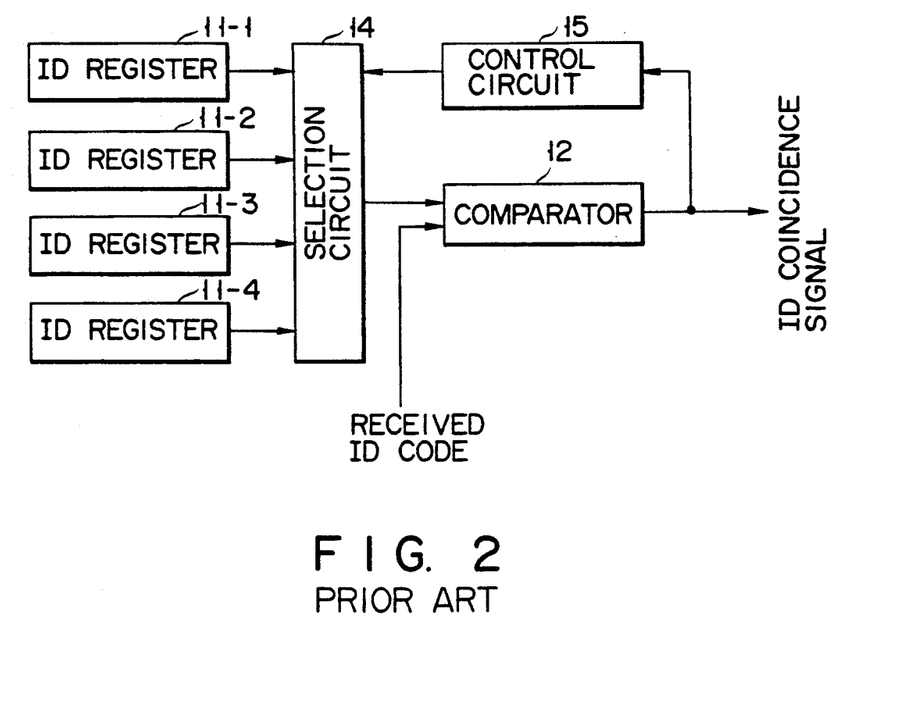

The circuit system shown in FIG. 2 is formed to solve the defects of the circuit of FIG. 1 and effect the same operation as the circuit of FIG. 1 by using a comparator, a control circuit and a selection circuit. Like the circuit of FIG. 1, previously attached ID codes are stored in the ID registers 11-1 to 11-4 and the ID codes stored in the ID registers 11-1 to 11-4 are supplied to the selection circuit 14. The selection circuit 14 is controlled by an output of the control circuit 15 and one of the ID codes stored in the ID registers 11-1 to 11-4 is sequentially selected. The ID code selected by the selection circuit 14 and a received ID code are supplied to and compared by the comparator 12. The comparison output of the comparator 12 is output as a coincidence signal indicating the coincidence of the ID codes.

When the coincidence of the ID codes is detected by the comparator 12, the signal is supplied to the control circuit 15 and the succeeding selecting operation of the selection circuit 14 is inhibited.

With the above construction, it is only necessary to use one comparator which requires a large pattern area when an IC is formed so that the pattern area can be made small. However, with the construction shown in FIG. 2, since the number of comparing operations to be repeatedly effected by the comparator 12 becomes larger as the number of ID codes becomes larger, time for comparison becomes long. This is extremely disadvantageous for high-speed transfer, and particularly, for real-time transfer in a system used on a car.

As described above, in the conventional received ID comparison system, the hardware becomes large, and if an attempt is made to solve this problem, the processing time may become long, making it difficult to attain the real-time process.

SUMMARY OF THE INVENTION

An object of this invention is to provide a multiplex communication system having a received ID comparison system capable of effecting the high-speed data transfer with a small number of hardwares.

The above object can be attained by a multiplex communication system comprising an ID code detecting circuit for detecting an ID code attached to data received from a network; a comparator for comparing the ID code detected by the ID code detecting circuit with a predetermined ID code and outputting a coincidence signal for permitting the received data to be selectively transferred to an instrument corresponding to the detected ID code when the ID code detected by the ID code detecting circuit coincides with the predetermined ID code; and a masking circuit for selecting a plurality of different instruments by using a single ID code detected by the ID code detecting circuit by masking at least one bit of the detected ID code at the time of comparison between the ID code detected by the ID code detecting circuit and the predetermined I code.

With the above construction, at least one bit of the ID code is masked by the masking circuit so that a plurality of different instruments can be selected by use of a single ID code. As a result, a multiplex communication system which has a received ID comparison system capable of effecting the high-speed data transferring process with a small amount of hardwares can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodi

DETAILED DESCRIPTION OF THE PREFERRED EMBODIMENTS

There will now be described an embodiment of this invention with reference to the accompanying drawings.

Figure 3:
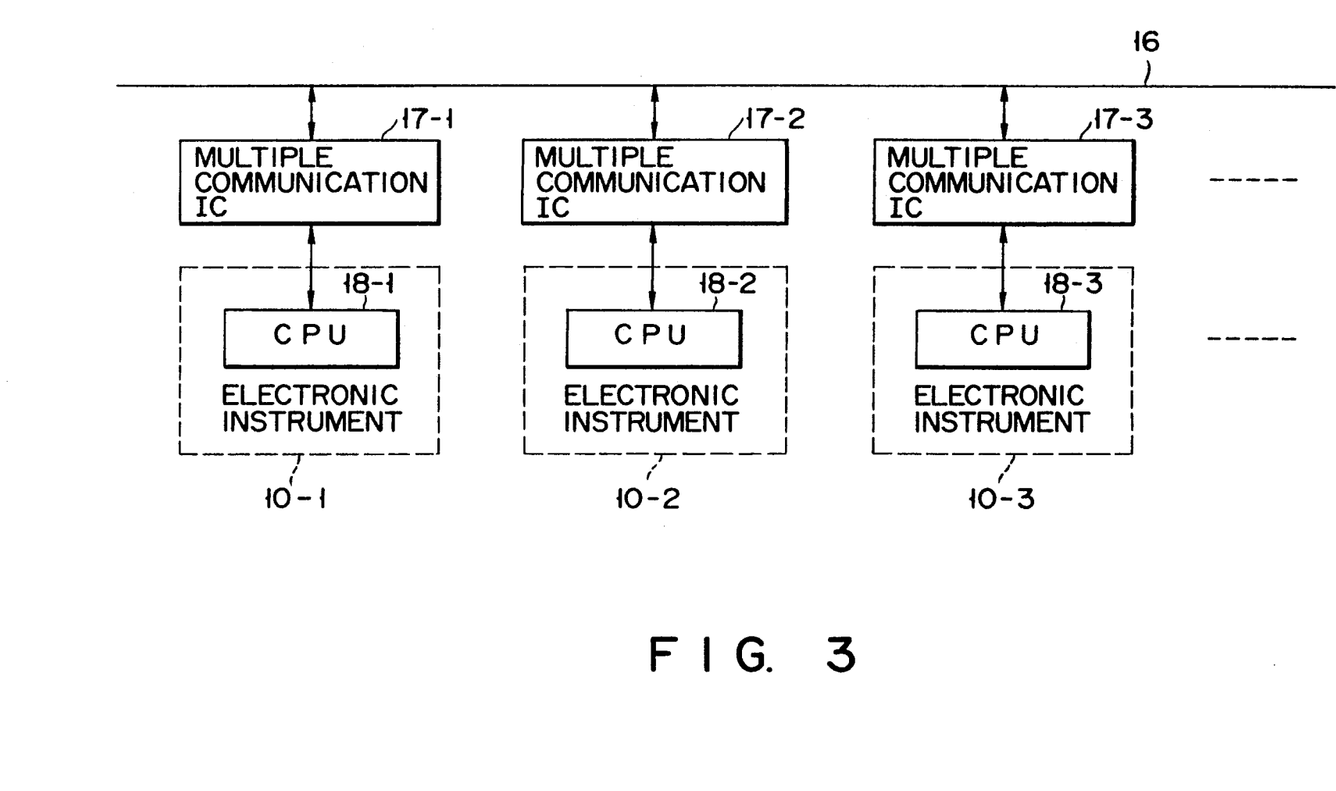
FIG. 3 is a block diagram showing the schematic construction of a multiplex communication system according to this invention.

FIG. 3 shows a schematic construction of a multiplex communication system to which this invention is applied. A network line 16 is connected to multiplex communication ICs 17-1, 17-2, 17-3, --- and electronic instruments 10-1, 10-2, 10-3, --- are provided for the respective multiplex communication ICs 17-1, 17-2, 17-3, ---. CPUs 18-1, 18-2, 18-3, --- are respectively provided in the electronic instruments 10-1, 10-2, 10-3, ---and the CPUs 18-1, 18-2, 18-3, --- control the transfer of data between the network line 16 and the electronic instruments 10-1, 10-2, 10-3, --- by means of the multiplex communication ICs 17-1, 17-2, 17-3, ---, the operations of the electronic instruments 10-1, 10-2, 10-3, --- and the like. For example, in a multiplex communication system for use on cars, the multiplex communication IC 17-1 and the electronic instrument 10-1 (CPU 18-1) are used to control the engine, for example. The multiplex communication IC 17-2 and the electronic instrument 10-2 (CPU 18-2) are used to control the brake and the multiplex communication IC 17-3 and the electronic instrument 10-3 (CPU 18-3) are used to control the transmission. In this way, the multiplex communication IC and the electronic instrument (CPU) are provided for each system.

Figure 4:
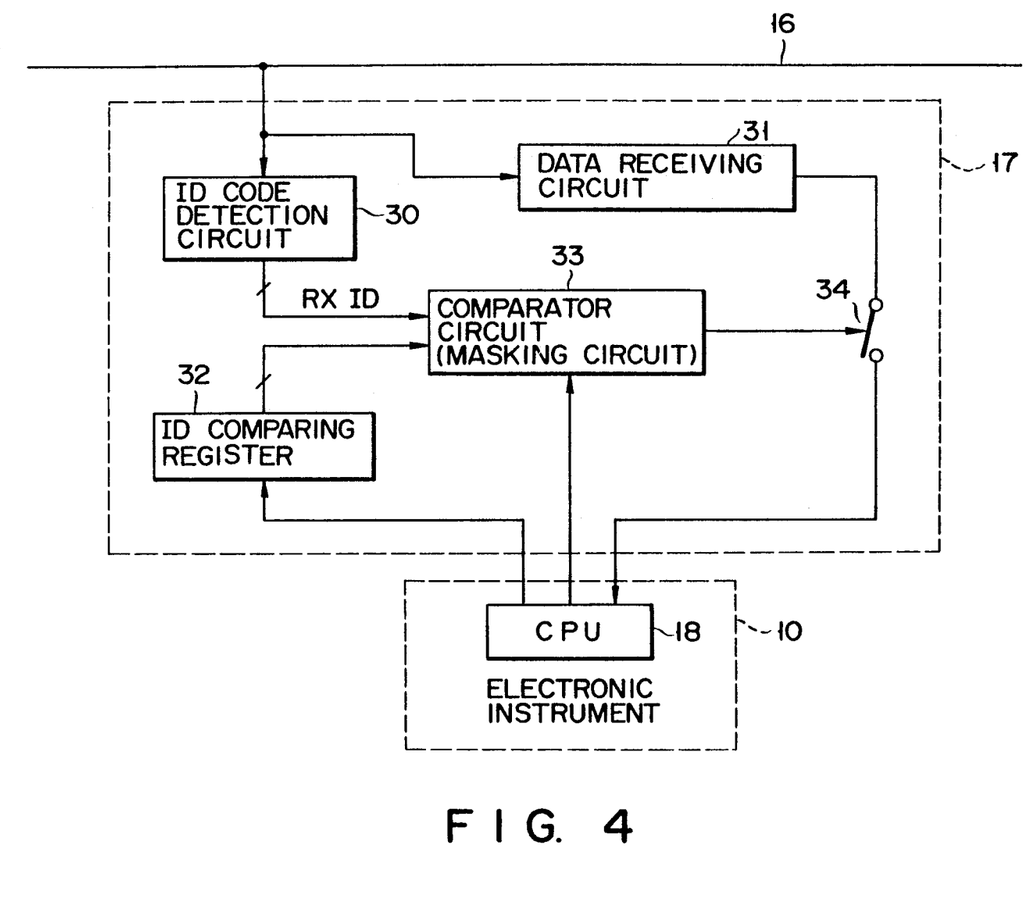
FIG. 4 is a block diagram showing the constructions of ID code comparison section and data receiving section extracted from the multiplex communication IC in the circuit of FIG. 3.

FIG. 4 shows the construction of the ID code comparison section and data receiving section extracted from the multiplex communication IC 17 in the circuit shown in FIG. 3. Data having an ID code attached thereto is transferred via the network line 16, the ID code is detected by an ID code detection circuit 30, and data is received by a data receiving circuit 31. The ID code (RX ID) detected by the ID code detection circuit 30 and an ID code stored in an ID comparing register 32 are compared with each other by means of a comparator circuit 33. Various predetermined ID codes corresponding to the rotation speed of the engine, the speed of the car and the like are stored in the ID comparing register 32. The comparator circuit 33 has a masking circuit for masking one or more bits in the ID code. The switching state of a switch 34 is controlled by a comparison output of the comparator circuit 33. When the compared ID codes are coincident with each other, the switch 34 is turned on and data received by the data receiving circuit 31 is transferred to the CPU 18.

The ID comparing register 32 stores an ID code according to a command from the CPU 18 and the comparator circuit 33 stores s bit position to be masked according to a command from the CPU 18. Thus, the ID code stored in the ID comparing register 32 and the to-be-masked bit position stored in the comparator circuit 33 can be freely changed according to the command from the CPU 18.

Figure 5:
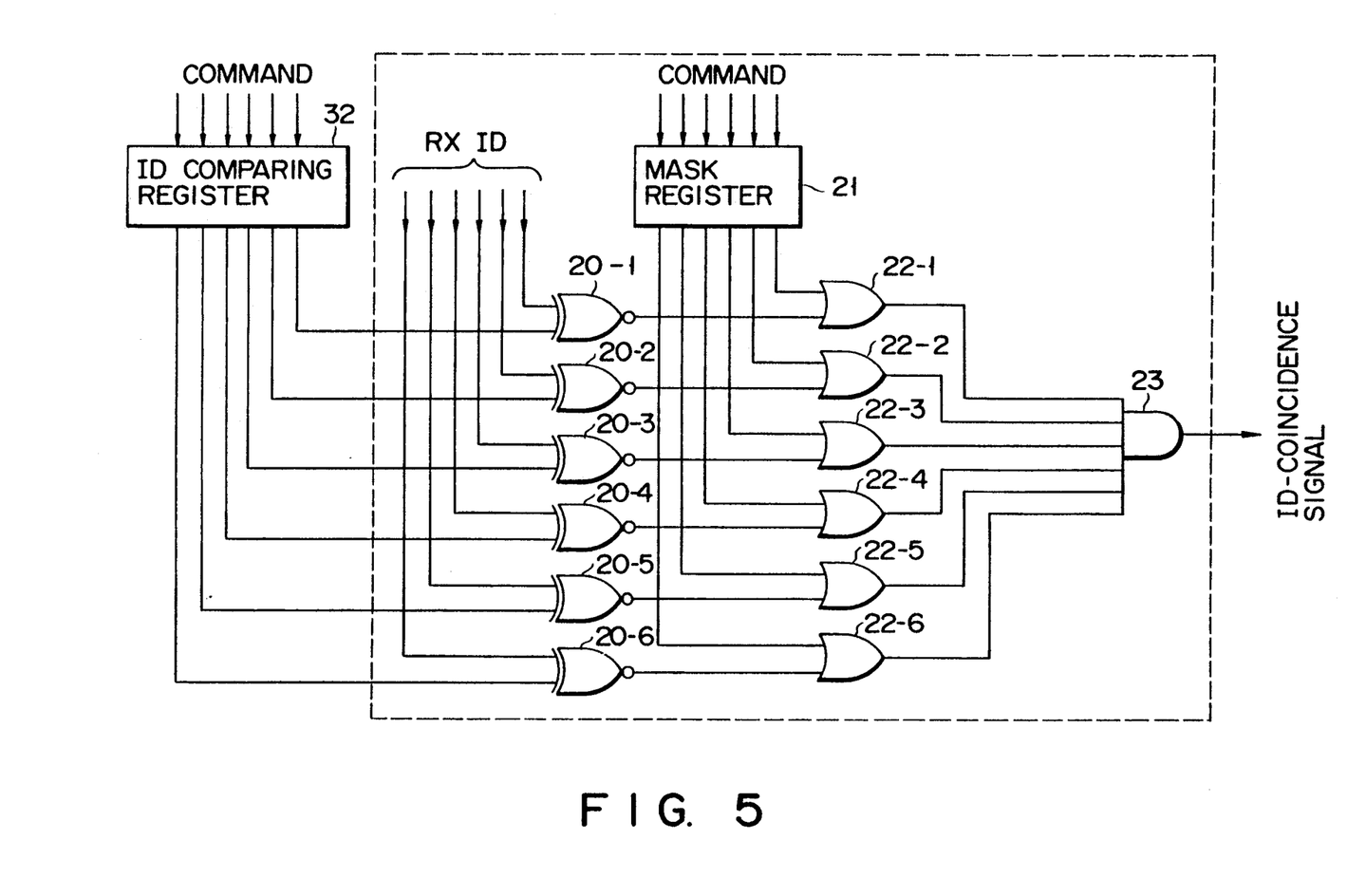
FIG. 5 is a circuit diagram showing a concrete example of the ID code comparison section in a multiplex communication system according to first embodiment of this invention and showing an example of the construction of the comparing circuit in the circuit of FIG. 4.

FIG. 5 shows an example of the construction of the comparator circuit 33 in the circuit shown in FIG. 4. The comparator circuit 33 includes Ex-NOR gates 20-1 to 20-6, a register (which is hereinafter referred to as a mask register) 21 for storing a specified bit position to be masked in the ID code, OR gates 22-1 to 22-6 and an AND gate 23. The ID code stored in the ID comparing register 32 and the received ID code (RX ID) are supplied to the Ex-NOR gates 20-1 to 20-6 for respective corresponding bits. Outputs of the Ex-NOR gates 20-1 to 20-6 are supplied to one-side input terminals of the OR gates 22-1 to 22-6, respectively, and the other input terminals of the OR gates 22-1 to 22-6 are supplied with data indicating the to-be-masked bit stored in the mask register 21 for respective bits. Outputs of the OR gates 22-1 to 22-6 are supplied to the AND gate 23 and a coincidence signal indicating the coincidence of the ID codes is output from the output terminal of the AND gate 23.

Next, the operation of the circuit having the above construction is explained. For example, ID codes ID0 to ID5 shown in the following table-1 are previously stored in the ID comparing register 32 according to a command (or a program) from the CPU and mask data items M0 to M5 are previously stored in the mask register 21 according to a command (or a program) from the CPU.

TABLE-1

|  | <MSB> | | | <LSB> | | |
| --- | --- | --- | --- | --- | --- | --- |
|  | 5 | 4 | 3 | 2 | 1 | 0 |
| ID COMPARING REGISTER | ID5 | ID4 | ID3 | ID2 | ID1 | ID0 |
| MASK REGISTER | M5 | M4 | M3 | M2 | M1 | M0 |

The received ID code (RX ID) is compared with each of the ID codes stored in the ID comparing register 32 for each bit by means of the Ex-NOR gates 20-1 to 20-6. As a result, an output of the Ex-NOR gate having coincident bits becomes "1" and an output of the Ex-NOR gate having non-coincident bits becomes "0". The logical sums between outputs of the Ex-NOR gates 20-1 to 20-6 and data of the mask register 21 are derived for respective bits. When all of the logical sum outputs are "1", the ID code is recognized as a necessary ID code. When two types of necessary ID codes are provided, one of the entire bits of the mask register 21 is set to "1" and when four types of necessary ID codes are provided, two of the entire bits of the mask register 21 are set to "1". An output of the OR gate corresponding to the bit position in which the mask data stored in the mask register 21 is set to "1" is processed as a coincident bit (forcedly set to "1") irrespective of the relation between the bit data of the received ID code and the ID code stored in the ID comparing register 32. In other words, the ID code stored in the corresponding bit position of the ID comparing register 32 may be "0" or "1". Therefore, two ID codes having bits of "0" and "1" stored in the corresponding two bit positions can be selected according to data (mask data) stored in the mask register 21.

Next, the operation of selecting a plurality of electronic instruments based on one received ID code is explained in detail. Assuming that such mask data as shown in the following table-2 is stored in the mask register 21, the ID code in the ID comparing register 32 is selected irrespective of whether the bit corresponding to the mask data of "1" is "0" or "1". In the table-2, marks * are attached in such bit positions.

TABLE-2

| | CONTENTS OF EACH REGISTER | |
|---|---|---|
| | ID COMPARING REGISTER | MASK REGISTER |
| NODE A | 00*0** | 001011 |
| NODE B | 0**00* | 011001 |
| NODE C | 10 | 110011 |

If the nodes A, B and C in the table-2 are set to correspond to the control systems shown in FIG. 3, that is, if the node A is set to correspond to the engine control system (multiplex communication IC 17-1 and electronic instrument 10-1), the node B is set to correspond to the brake control system (multiplex communication IC 17-2 and electronic instrument 10-2) and the node C is set to correspond to the transmission control system (multiplex communication IC 17-3 and electronic instrument 10-3), then a plurality of control systems can be selected with the relation set as shown in the following table-3.

TABLE-3

| | ID RECEIVED AT EACH NODE | | | | | | | |
|---|---|---|---|---|---|---|---|---|
| | MBS | | | | | | | |
| LSB | 000 | 001 | 010 | 011 | 100 | 101 | 110 | 111 |
| 000 | A,B | A,B,C | B | B,C | | C | | C |
| 001 | A,B | A,B,C | B | B,C | | C | | C |
| 010 | A | A,C | | C | | C | | C |
| 101 | A | A,C | | C | | C | | C |
| 101 | | | | | | | | |
| 110 | | | | | | | | |
| 111 | | | | | | | | |

In the case of the node A, for example, when the ID code in the ID comparing register 32 and the received ID code are coincident with each other with respect to "00*0", a coincidence signal is obtained. That is, when both of the ID codes are "000000", "000001", "000010", "000011", "001000", "001001", "001010" or "001011", a coincidence signal is output to the engine control system. In the case of the node B, when the ID code in the ID comparing register 32 and the received ID code are coincident with each other with respect to "000*", a coincidence signal is obtained. Also, in this case, a coincidence signal is output to the brake control system according to a plurality of different ID codes in the same manner as in the case of the engine control system. Likewise, the transmission control system is selected according to a plurality of ID codes. In this way, when the ID code is "000000", data items having the ID code attached thereto are supplied to the CPUs 18-1 and 18-2 of the engine control system and brake control system. Further, when the ID code is "001000", data items having the ID code attached thereto are supplied to the CPUs 18-1, 18-2 and 18-3 of the engine control system, brake control system and transmission control system.

With the above construction, since a single ID code comparing section is provided for a plurality of ID codes (since the ID code has a plurality of bits, a plurality of Ex-NOR gates appear to be provided, but the Ex-NOR gates 20-1 to 20-6 correspond to one of the comparators 12-1 to 12-4 in the circuit of FIG. 1), the number of hardwares can be reduced in comparison with the circuit system shown in FIG. 1. Further, a plurality of ID codes stored in the ID comparing register 32 and a received ID code are sequentially compared with each other in the same manner as in the circuit system shown in FIG. 2, but since a plurality of control systems (electronic instruments) can be selected by use of one ID code based on mask data stored in the mask register 21, the data transfer speed can be enhanced in comparison with the circuit of FIG. 2 if the number of data types is the same. Since a plurality of necessary data types can be processed by use of the same hardware, the circuit is preferable when forming the circuit on one chip (in an integrated circuit form).

Figure 6:
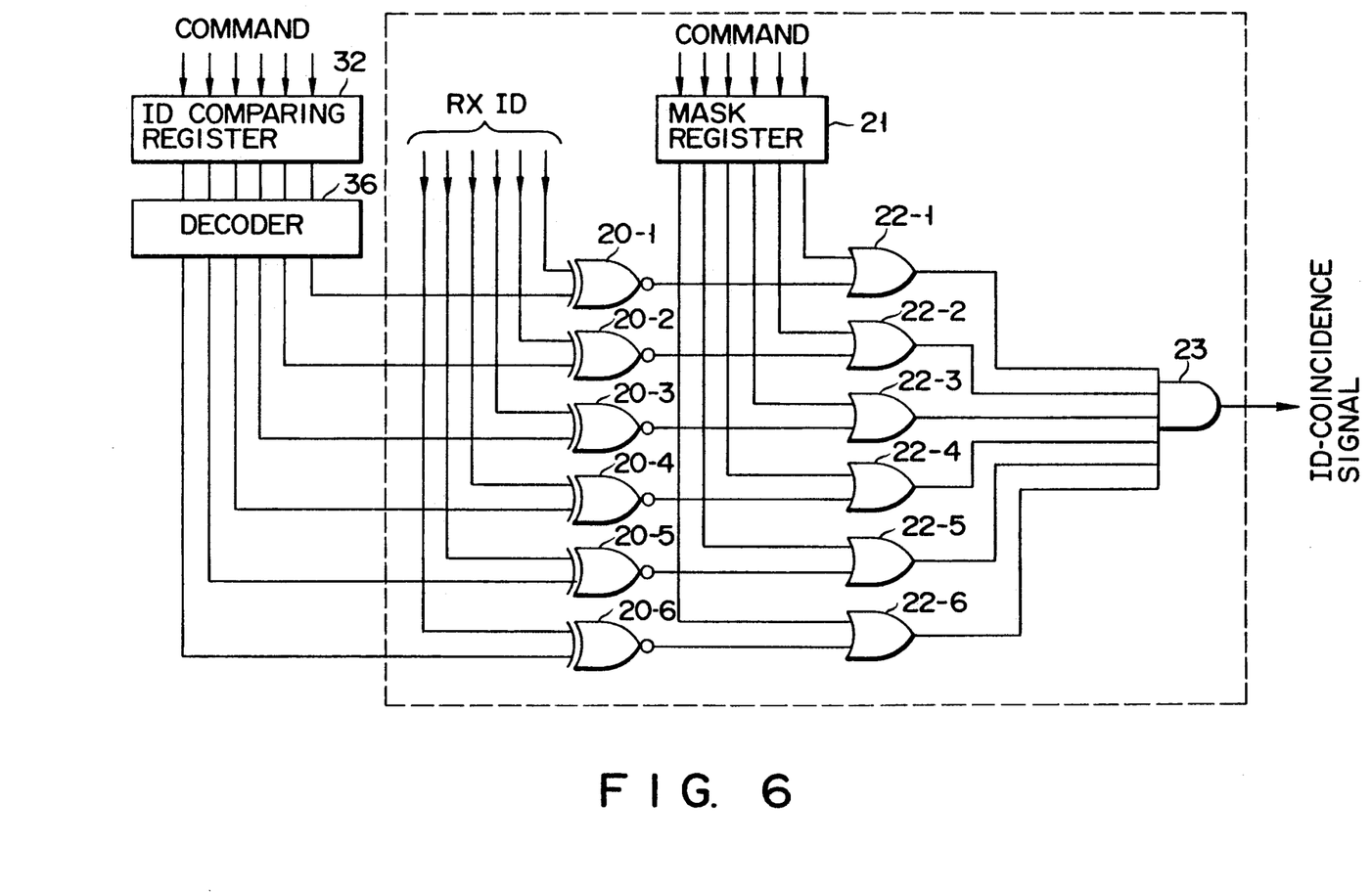
FIG. 6 is a circuit diagram showing a concrete example of the ID code comparison section in a multiplex communication system according to a second embodiment of this invention and showing another example of the construction of the comparing circuit in the circuit of FIG. 4.

In the circuit of FIG. 5, the ID code stored in the ID comparing register 32 is directly supplied for each bit to the one-side terminals of the Ex-NOR gates 20-1 to 20-6. However, it is also possible to supply an output signal of the ID comparing register 32 to a decoder 36 so as to decode the same and supply the decoded signal to the one-side terminals of the Ex-NOR gates 20-1 to 20-6 as shown in FIG. 6. Use of the decoder 36 makes it possible to effect the simultaneous selecting operation which is more complicated than the operation of simultaneously selecting the electronic instruments shown in the table-3.

Further, in each of the above embodiments, a multiplex communication system for use on cars is explained as an example, but this invention is not limited to the system for use on cars and this invention can be applied to other various multiplex communication systems.

As described above, according to this invention, a multiplex communication system having a received ID comparing system capable of effecting a high-speed data transfer process with a small number of hardwares can be provided.

What is claimed is:

1. A multiplex communication system adapted for coupling to a network and to an instrument, the system comprising:
    ID code detecting means for detecting a first ID code received from the network;
    comparing means for comparing the first ID code with a second ID code received from the instrument, and for generating a coincidence signal for permitting data received from the network to be selectively transferred to the instrument when the first ID code coincides with the second ID code; and
    masking means for masking at least one bit position of the first ID code, to control the comparing means, the at least one bit position being determined by the instrument.

2. A multiplex communication system according to claim 1, wherein said masking means includes storing means for storing a bit position of the ID code to be masked according to a command from a CPU, logical sum means for deriving a logical sum of the stored data in said storing means and a comparison output of said comparing means, and logical product means for outputting a coincidence signal indicating the coincidence of the ID codes.

3. A multiplex communication system according to claim 2, wherein said storing means includes a register.

4. A multiplex communication system according to claim 2, wherein said logical sum means includes an OR gate.

5. A multiplex communication system according to claim 2, wherein said logical product means includes an AND gate.

6. A multiplex communication system according to claim 1, wherein said comparing means includes exclusive-NOR means for deriving an exclusive-NOR value of the ID code detected by said ID code detecting means and the second ID code.

7. A multiplex communication system according to claim 6, wherein said exclusive-NOR means includes Ex-NOR gates of a number corresponding to the number of bits of the ID code and said Ex-NOR gates are supplied with respective bits of the ID code detected by said ID code detecting means at one-side input terminals thereof and respective bits of the second ID code at the other input terminals thereof.

8. A multiplex communication system according to claim 1, further comprising storing means for storing the second ID code.

9. A multiplex communication system according to claim 8, wherein said storing means includes a register.

10. A multiplex communication system according to claim 8, further comprising decoder means for decoding data stored in said storing means and supplying the decoded data to said comparing means.

11. A multiplex communication system adapted for coupling to a network and to a CPU, the system comprising:
   first storing means for storing an ID code received from the CPU, the ID code corresponding to an instrument;
   comparing means for comparing an ID code attached to data received from the network with the ID code stored in said first storing means, to generate a comparison result;
   second storing means for storing at least one bit position received from the CPU;
   masking means for masking the comparison result according to data stored in said second storing means; and
   coincidence detecting means for detecting a coincidence between the ID code attached to data received from the network and the ID code stored in said first storing means according to the comparison result.

12. A multiplex communication system according to claim 11, wherein said first storing means includes a register.

13. A multiplex communication system according to claim 11, wherein said comparing means includes exclusive-NOR means for deriving the exclusive-NOR values between respective bits of the ID code attached to data received from the network and respective bits of the ID code stored in said first storing means.

14. A multiplex communication system according to claim 13, wherein said exclusive-NOR means includes Ex-NOR gates of a number corresponding to the number of bits of the ID code and said Ex-NOR gates are supplied with respective bits of the ID code attached to data received from the network at one-side input terminals thereof and respective bits of the ID code stored in said first storing means at the other input terminals thereof.

15. A multiplex communication system according to claim 11, wherein said second storing means includes a register.

16. A multiplex communication system according to claim 11, wherein said masking means includes logical sum means for deriving a logical sum between data stored in said second storing means and the comparison result.

17. A multiplex communication system according to claim 16, wherein said logical sum means includes an OR gate.

18. A multiplex communication system according to claim 11, wherein said coincidence detecting means includes logical product means for deriving a logical product of the outputs of said masking means.

19. A multiplex communication system according to claim 18, wherein said logical product means includes an AND gate.

* * * * *

UNITED STATES PATENT AND TRADEMARK OFFICE
CERTIFICATE OF CORRECTION

PATENT NO. : 5,276,683
DATED : January 04, 1994
INVENTOR(S) : Yasuo Ohkubo

It is certified that error appears in the above-indentified patent and that said Letters Patent is hereby corrected as shown below:

Claim 4, column 7, line 8, change "OR" to --OR--.

Signed and Sealed this

Twenty-seventh Day of December, 1994

Attest:

BRUCE LEHMAN

Attesting Officer     Commissioner of Patents and Trademarks